United States Patent [19]
Kuwana

[11] 3,877,758
[45] Apr. 15, 1975

[54] PROCESS FOR THE CONTROL OF AN ANTISKID BRAKING SYSTEM AND APPARATUS ADAPTED FOR PERFORMING THE SAME

[75] Inventor: Kazutaka Kuwana, Kariya, Japan

[73] Assignee: Aisin Seiki Kabushiki Kaisha, Kariya City, Aichi pref., Japan

[22] Filed: June 29, 1973

[21] Appl. No.: 375,235

Related U.S. Application Data

[62] Division of Ser. No. 82,027, Oct. 19, 1970, Pat. No. 3,756,662.

[30] Foreign Application Priority Data
Oct. 18, 1969 Japan.............................. 44-083495

[52] U.S. Cl. .................................. 303/21 F; 303/61
[51] Int. Cl............................................... B60t 8/10
[58] Field of Search ............... 60/545; 91/33, 434; 250/30; 303/20, 21 F, 61

[56] References Cited
UNITED STATES PATENTS

| | | | |
|---|---|---|---|
| 3,066,988 | 12/1962 | McRae | 303/21 F X |
| 3,497,269 | 2/1970 | Van Wicklin, Jr. | 303/21 F |
| 3,547,501 | 12/1970 | Harned et al. | 303/20 X |
| 3,549,212 | 12/1970 | Leiber | 303/21 F |
| 3,556,609 | 1/1971 | MacDuff | 303/21 F |
| 3,559,532 | 2/1971 | MacDuff et al. | 303/21 F X |
| 3,574,417 | 4/1971 | Howard et al. | 303/20 X |
| 3,663,070 | 5/1972 | Scharlack | 303/20 X |

Primary Examiner—Trygve M. Blix
Assistant Examiner—Stephen G. Kunin
Attorney, Agent, or Firm—Sughrue, Rothwell, Mion, Zinn & Macpeak

[57] ABSTRACT

This invention presents an improved antiskid brake control method and apparatus for wheeled automotive vehicles which utilizes an electronic circuit into which input signals representing vehicle speed, wheel speed and hydraulic brake apply pressure are fed. The electronic control circuit computes the rate of vehicle deceleration and the ratio of the wheel speed to the vehicle speed and compares this ratio with a constant value. An output signal from the electronic circuit is used to control an electric solenoid valve in the hydraulic brake circuit to modulate the hydraulic pressure and obtain an optimum vehicle braking effort under all conditions and prevent a vehicle skid condition from arising.

5 Claims, 9 Drawing Figures

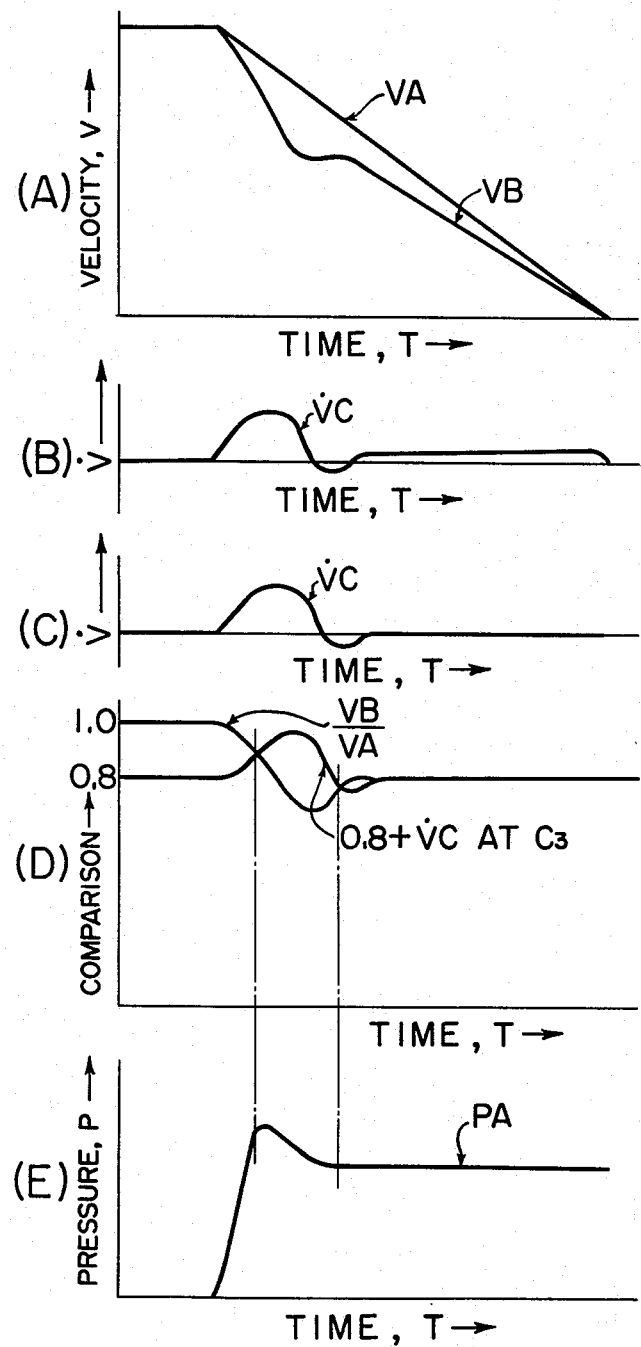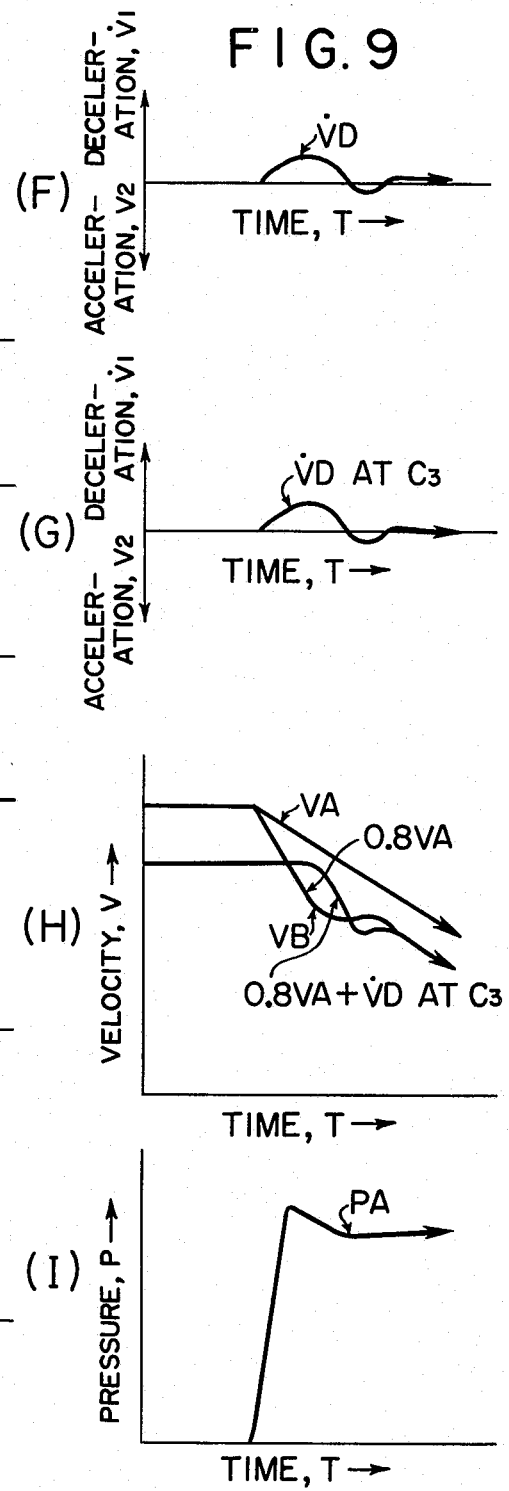
FIG. 7
FIG. 9

PROCESS FOR THE CONTROL OF AN ANTISKID BRAKING SYSTEM AND APPARATUS ADAPTED FOR PERFORMING THE SAME

This is a Division of application Ser. No. 82,027, filed Oct. 19, 1970 now U.S. Pat. No. 3,756,662 granted Sept. 4, 1973.

This invention relates to improvements in and relating to antiskid brake control method for use with powered and wheeled vehicles, especially automotive vehicles, and an apparatus for realization of the same.

The main purpose of the invention is to provide a substantially improved process and apparatus, capable of providing a shortest possible brake application period for the realization of a certain desired degree of vehicle braking effect such as stoppage of a running vehicle, under utilization, as far as possible, of the maximum adhesive force acting between the wheel tyre and the traffic surface on which the vehicle is travelling.

A further object is to provide a method and apparatus of the kind above referred to, capable of maintaining the inevitable fluctuation of the vehicle deceleration rate during a brake application period.

These and further objects, features and advantages of the invention will become more apparent when read the following detailed description of the invention in comparison with the comparative prior art.

Figure 4:
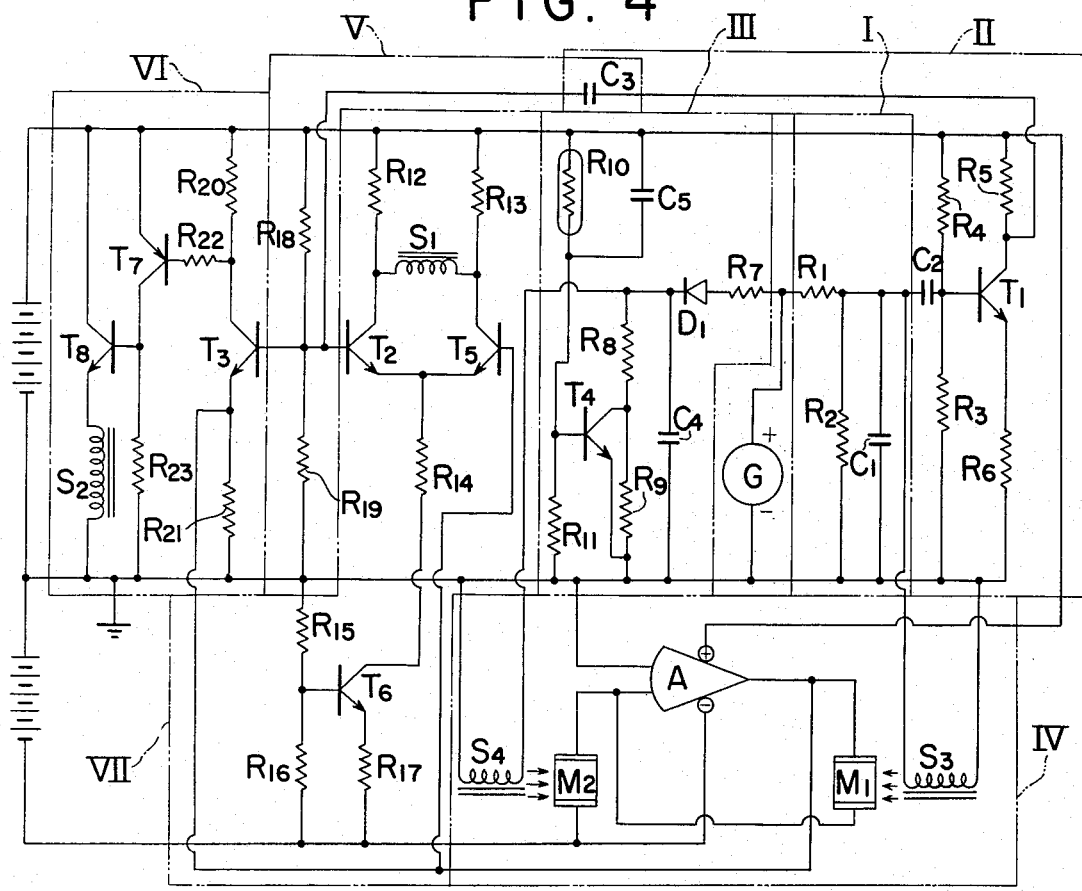
FIG. 4 is a wiring diagram illustrative of a preferred embodiment of the electronic circuit employable in the apparatus adapted for carrying out the process according to the invention.

FIG. 7, (A) - (B), is illustrative of several illustrative diagrams, wherein at (A), a V-T chart of vehicle speed VA and wheel speed VB is shown; at (B), a V-T chart of wheel deceleration degree VC; at (C), a V-T chart of wheel deceleration degree VC appearing at condenser C3 shown in FIG. 4; at (D), a comparison diagram of VB/VA and (0.8 plus VC as appearing at said condenser C3); and at (E), a P-T chart of brake pressure PA.

Figure 8:
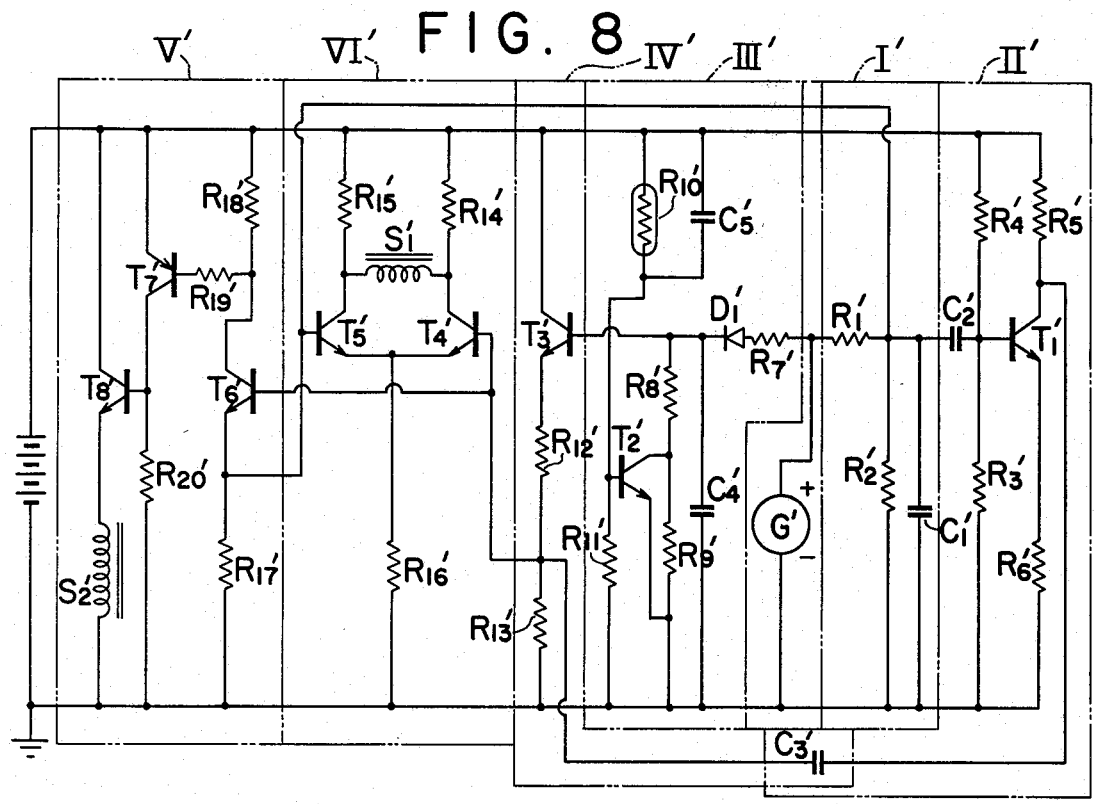

FIG. 8 is a similar view of FIG. 4, illustrative, however, of a second embodiment of the electronic circuit employable in the apparatus according to this invention.

FIG. 9, (F) - (I), is a substantially similar view to FIG. 7, illustrating, however, the working modes of the second embodiment of the invention employing the electronic circuit shown in FIG. 8.

Figure 1:
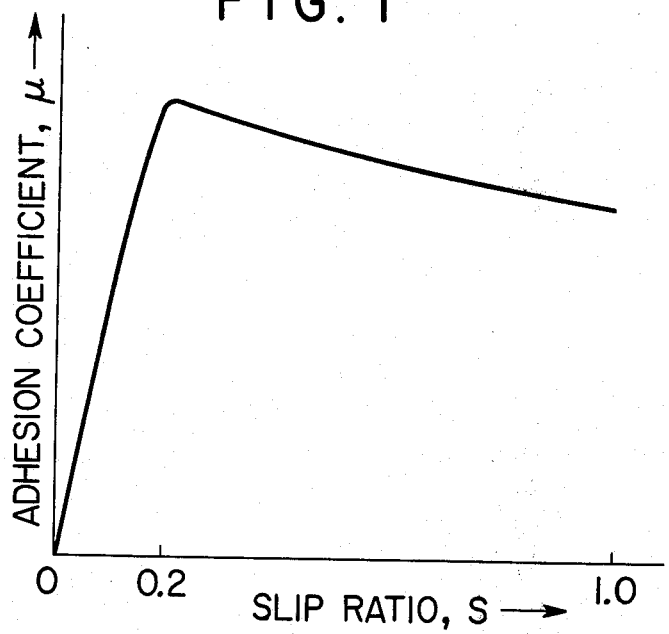
FIG. 1 is a chart in which the general tendency of the adhesive coefficient "mu" acting between the traffic surface on which an automotive vehicle is running and the wheel tire thereof, said coefficient being plotted against the slip ratio "S".

Before entering into a specific and detailed description of substantially two preferred embodiments of the apparatus adapted for carrying out the method of the invention, we will illustrate at first by reference to FIG. 1 a general physical rule governing the relationship between the adhesion coefficient appearing between the tire of a running vehicle wheel, on the other hand, and the slip ratio appearing during application of braking upon the wheel and being normally expressed by S among those who are skilled in the art, the said coefficient being denoted by mu as is commonly known. As seen, the coefficient mu will take its maximum value generally with the slip ratio S substantially equal to 0.2.

Figure 2:
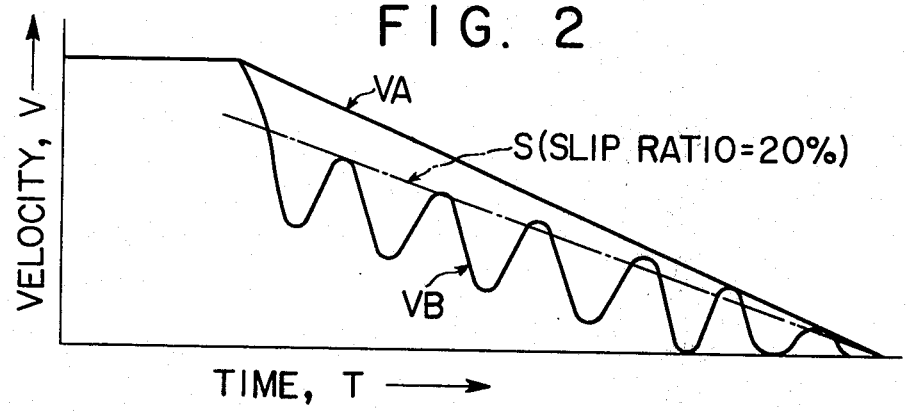
FIG. 2 is a chart called briefly V-T chart, as met with a comparative art antiskid apparatus, showing a representative relationship between wheel speed "VA" as well as wheel speed "VB" plotted against time, wherein, however, the slip ratio has been assumed to be 20% S, S being the slip ratio mentioned above.
Figure 3:
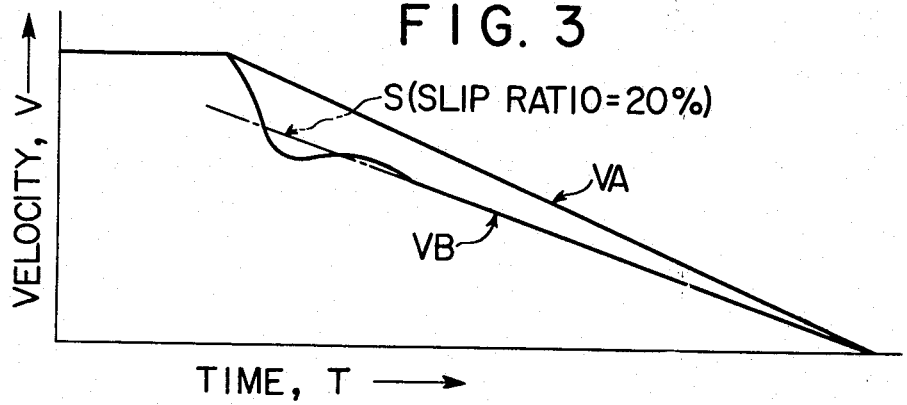
FIG. 3 is a similar view to FIG. 2, showing, however, a representative V-T chart appearing in an improved apparatus according to the invention, the slip ratio being taken again 20% S.

In FIG. 2, a representative braking operation with a conventional automotive brake system is diagrammatically illustrated. In this chart, VA represents the deceleration of an automotive wheel when the latter is being braked intentionally by means of a comparative conventional powered brake system of the antiskid type and VB represents wheel running speed during the brake application period. A chain-dotted line S represents a curve of the slip ratio S taking at 20 percent for the reason set forth hereinabove. As seen, the wheel is subjected to a repetition of deceleration and re-acceleration, so as to realize an approximation to said curve S during the whole brake application period. This apparently tedious braking procedure is aimed at the prevention of a wheel lock as frequently and otherwise appearing upon application of a sudden and substantial braking effort to the running wheel.

It has been, however, experienced in practice that such a frequent repetition of wheel speed deceleration and re-acceleration as shown only schematically in FIG. 2 will invite naturally a corresponding substantial change in the slip ratio, resulting in a corresponding variation in the adhesion coefficient above referred to. This means that much is desired to bring about the desirous approximation to the maximum adhesion curve such as represented by the chain-dotted line S in FIG. 2, which will result in a prolonged brake application period for stopping the running vehicle by application of a certain degree of braking effort. In addition, the passenger will have naturally an unpleasant driving feel during the brake application period.

It will be further experienced frequently that with use of the conventional antiskid brake system, especially when the powered vehicle is travelling at low speed, the wheel speed becomes substantially same that of the vehicle, resulting in a substantially non-braked condition, or in the braked wheel brought into its unlocked condition. Under these extreme conditions, the aforementioned conventional drawbacks will become rather more apparent.

In order to obviate the aforementioned conventional drawbacks, the novel principle according to this invention resides in such during an application of brake to the vehicle wheel, the wheel speed is gradually reduced so as to bring the wheel velocity or speed substantially coinciding with that representing 20 percent of slip ratio and thus realizing nearly a possible maximum value of the adhesive force acting between the travelling surface and the wheel tire.

The technical idea proposed by the application is as follows:

Now assuming:

S = Slip ratio = 1 − wheel speed/vehicle speed

So = slip ratio creating maximum possible adhesion coefficient;

Wg = wheel deceleration or acceleration = (wheel deceleration or acceleration/vehicle speed);

Then, we obtain the following relation in the case of wheel deceleration:

S − So + |Wg| = K

In the similar way, we obtain the following relation in the case of wheel acceleration:

S − So − |Wg| = K

According to the invention, the hydraulic brake pressure is reduced in relation to the value of |K|, when K is larger than zero.

When K is smaller than zero, the hydraulic pressure is increased in relation to the value of |K|.

A preferred circuit arrangement constituting a main constituent of the apparatus adapted for the realization of the process according to this invention is as follows:

In FIG. 4 "I" represents a wheel speed sensing circuit which comprises a d.c. generator "G" which is mechanically coupled with the axle of an automotive wheel to be subjected to hydraulic braking by the control process and apparatus according to this invention, although not specifically shown in the drawing. Resistors R1 and R2 and condensor C1 are connected to each other as shown, so as to smoothening the voltage output delivered from the d.c. generator G in response to the occasional speed of the vehicle speed.

In FIG. 4, block "II" represents a wheel deceleration or acceleration sensing circuit comprising condenser C2, resistors R3, R4, R5 and R6 and transistors T1, T2 and T3, these circuit components being electrically connected as shown, although not specifically described for simplicity of the specification.

The smoothed voltage output delivered from the wheel speed sensor I is differentiated in a differentiating circuit comprising condenser C2 and resistors R3 and R4 and added thus with a bias voltage, and then subjected to phase reversion and amplification by passage through the combination of transistor T1, resistors R5 and R6, thence supplied through coupling condenser C3 to the base electrodes of transistors T2 and T3. Thus, base potential appearing at these transistors T2 and T3 is a function of the variation of the collector voltage appearing at the transistor T1. It is seen from the foregoing that the base potential appearing at transistors T2 and T3 is responsive to the deceleration or acceleration of the vehicle wheel under being braked. The potential will become higher with increased deceleration of the wheel, and vice versa. The voltage output smoothed at and delivered from the speed sensor I is conveyed further to a solenoid S3 which is included in a ratio sensor IV to be described.

The voltage derived from d.c. generator G is conveyed through a resistor R7 and deode D1 to condenser C4 and charged therein. This charged voltage is discharged through an equivalent resistance composed by resistors R8 and R9 and transistor T4, these circuit elements being included in a pseudo-vehicle speed setting circuit III. This circuit comprises further a pressure-responsive resistor R10 which is arranged in the hydraulic brake circuit so as to represent smaller resistance with increase of the hydraulic brake pressure and vice versa, although not specifically illustrated in the drawing. As an example, however, this resistor R10 is immersed in the hydraulic brake circuit, not shown, and electrically connected in this circuit III as shown. It will be seen from above that the pressure-responsive resistor R9 provides a variable resistance in response to the occasionally applied brake pressure and arranged to cooperate resistor R11 and transistor T4, so as to vary the quivalent resistance provided by these circuit elements. The voltage charge in condenser C4 is utilized for energizing solenoid S4.

The ratio sensor circuit IV comprises an amplifier "A", solenoids S3 and S4 and magnetic resistor M1 and M2, these are electrically connected with each other as shown, and said circuit is adapted for sensing the ratio of wheel speed to vehicle speed, as will be described more in detail hereinbelow.

As seen from the foregoing, the output voltage from the amplifier corresponds to the ratio of resistance of M1 to resistance of M2. As symbolically described by a plurality of small arrows shown, the resistance value of magnetic resistor (magnetism responsive resistor) M1 will become larger with increased electromagnetic energization of solenoid S3. Or more specifically, it varies in response to the wheel speed.

In the similar way, the resistance value at M2 will vary in response to the electromagnetic energization of solenoid S4. It will be seen, it varies with the charged voltage at condenser C4. It will be further seen from the drawing that the output voltage of amplifier "A" will provide the base potential of transistor T5 and the emitter potential of transistor T2.

The circuit arrangement shown in FIG. 4 further comprises a ratio-setting circuit V which comprises resistors R18 and R19 which are electrically connected as shown. This circuit is adapted for providing the necessary bias voltage to the base electrodes of transistors T2 and T3 so as to bring the ratio of wheel speed to vehicle speed to a constant level.

The circuit arrangement shown in FIG. 4 includes further a first comparator VI adapted for descriminating the increase or decrease, as the case may be, of the hydraulic brake pressure and comprises transistors T3, T7 and T8, resistors R20, R21, R22 and R23 and solenoid S2 which are electrically connected with each other as shown. This first comparator is so designed and arranged that when the base potential at transistor T3 is larger than the emitter potential at the same transistor T3, the latter becomes conductive by the provision of the resistors R20-R23, and also the transistors T7 and T8 will become conductive, thereby a current flowing through solenoid S2. Inversely, when the base potential at T3 is lower than its emitter potential, the transistors T3, T7 and T8 will all become nonconductive. No current will flow through the solenoid S2 at this stage.

The circuit arrangement shown in FIG. 4 includes further a second comparator VII which comprises transistors T2, T5, and T6, resistors R12, R13, R14, R15, R16 and R17 and solenoid S1 which are electrically connected with each other as shown, and is adapted for comparing the ratio of wheel speed to vehicle speed, to the output of the ratio setter V. This circuit VII serves, in other words, for varying the speed or velocity which has been determined in its sense by the first comparator VI. It will be seen that current will be supplied through solenoid S1 in function of the difference between the base potential at T2 and that appearing at T5.

Next, referring to FIG. 5, a hydraulic brake pressure modulator is illustrated hereinbelow in detail.

In this modulator, reference numeral 10 denotes a change-off valve which is so designed to change-off between atmospheric pressure and vacuum, and under control of the solenoid S2 which is same as that shown in FIG. 4. When the solenoid S2 is energized, the valve is shifted downwards from the position shown and chamber 12 is brought into communication with ambient atmosphere through a connection duct 100.

On the contrary, when the solenoid S2 is kept in its de-energized position as shown, the valve 10 is kept in its shown upper position, so as to keep connection of the chamber 12 with an engine suction manifold, only shown by a numeral 18, through duct 100, the now open valve 10 and branch duct 101. Therefore, it will be seen from the foregoing that this valve 10 serves for controlling the vacuum flow or ambient air flow to the chamber 12.

With de-energization of solenoid S1 which is same as that shown in FIG. 4, any flow through the duct 100 is interrupted to nil by the plunger valve 11 controlled by the solenoid S1. Depending upon the energization of the latter, the flow quantity through the duct 100 is increased.

Chambers 12 and 13 are formed in a stationary casing 102 and separated from each other by the movable piston shown at 14. As seen from FIG. 5, the chamber 13 is always kept in communication with the vacuum source 18. Or more precisely, energization of solenoid S2 will result in a corresponding reduction of the hydraulic brake pressure, while de-energization of the solenoid will serve for recovery of the brake pressure. With increased current flow through solenoid S1, the brake pressure reducing speed and the brake pressure recovery speed are correspondingly increased.

Now referring to FIGS. 4–6, the operation of the first embodiment of the invention will now be described.

Figure 6:
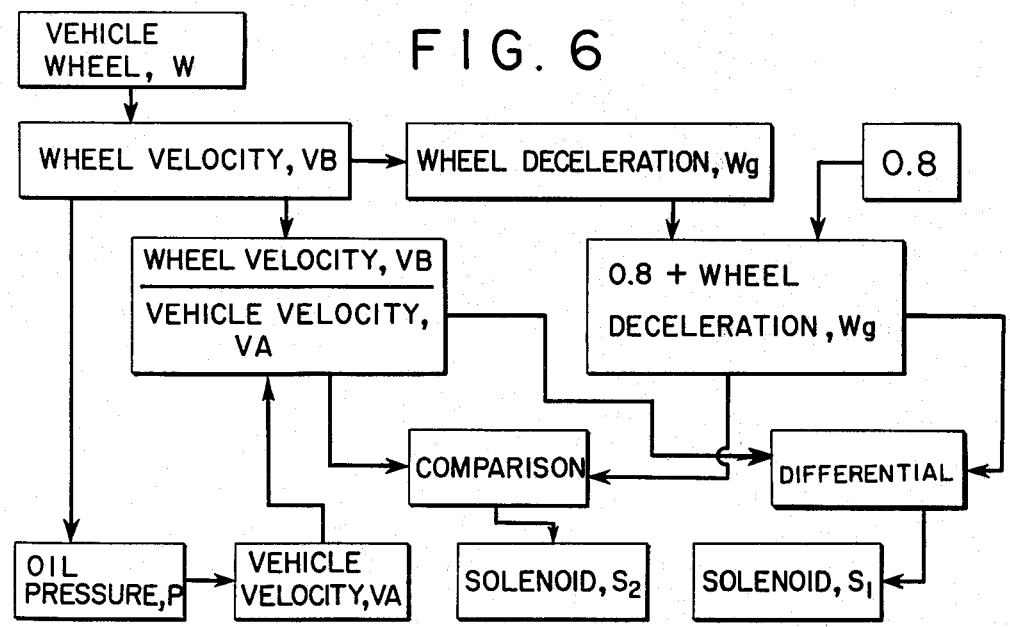
FIG. 6 is a chart illustrative of the working mode of the apparatus according to this invention.

In FIG. 6, block "W" denotes only schematically the vehicle wheel; block VA the vehicle speed or velocity; and block VB the wheel speed or velocity. It will be seen from the drawing that the current flow through solenoid S1 will vary in function of the difference between the ratio: VB/VA and (0.8 + Wg). With increased quantity of the energization current, the brake pressure reducing speed and the recovery speed will become correspondingly larger, as was referred to above.

When the said ratio is larger than the said difference, no current will flow through solenoid S2, the resulting brake pressure being brought into its pressure recovery step. With the said value ratio smaller than the said difference, current will pass through solenoid S2 for reducing the brake pressure.

In connection with the above general operational mode, the specific operation of the circuit shown in FIG. 4 will now be given below in detail:

It will be seen from the foregoing that a voltage corresponding to occasional vehicle speed is charged in condenser C4. When it is assumed that the vehicle is travelling at a certain speed without any application of the brake. Then, since the brake pressure is nil, the pressure responsive resistor R10 will provide a certain large resistance value so that the equivalent resistance of transistor T4 is substantially larger and the condenser C4 is difficult to discharge. Therefore, a voltage corresponding to the vehicle speed has been charged in this condenser.

When the brake is applied under these conditions, the wheel speed initiates to reduce and the condenser C4 will begin to discharge. Since, generally speaking, the brake pressure is substantially in relation with the vehicle speed and the charge accumulated in condenser C4 will be discharged by such amount which corresponds to the vehicle deceleration degree in response to the applied brake pressure and as determined by the combined amount of the equivalent resistance of transistor T4, with the values of resistors R8 and R9. Therefore, it will be seen that condenser C4 has always its charge accumulated therein and corresponding to the occasional and ever varying vehicle speed in this case.

As seen from the foregoing, a wheel speed responsive resistance is owned always by the magnetism responsive resistor M1, while a vehicle speed responsive resistance is appeared at M2. Thus, the output voltage from the amplifier A will be that which corresponds to the ratio: wheel speed/vehicle speed.

On the other hand, a bias voltage corresponding to 0.8 of the wheel speed divided by vehicle speed, corresponding to 20 percent slip ratio, is previously set by resistors R18 and R19. Then, this bias voltage and the wheel deceleration voltage appearing at coupling condenser C3 are overlapped with each other. Under these conditions, generation of a wheel deceleration will produce a correspondingly reduced potential and vice versa. Therefore, a current in relation with the following term will flow through solenoid S1

{(wheel speed/vehicle speed) − (0.8 + wheel deceleration degree)}

On the other hand, no current will flow through solenoid S2, when the ratio: wheel speed/vehicle speed exceeds the value of (0.8 + wheel deceleration degree), and vice versa.

Under normal travel condition of the vehicle without brake application, (wheel speed/vehicle speed = 1;
wheel deceleration degree 0;
and
wheel speed/vehicle speed > (0.8 + wheel deceleration degree)

Thus, no current flow in this case through solenoid S2. At this stage, current is flowing through solenoid S1, but valve 10 is kept in its normal position shown in FIG. 5, and, therefore, no flow of atmospheric air or vacuum may be observed at the valve 11. Thus, no influence will be provided at this stage on the brake pressure.

Next, an application of sudden and substantial brake is explained.

In this case, when the brake application is of abrupt and substantial degree, the wheel speed is subjected to a sudden reduction. Therefore, the wheel speed will become abruptly reduced and thus, the wheel speed deceleration degree will become correspondingly large. The ratio: wheel speed/vehicle speed will become gradually smaller than unity. Correspondingly, the value (0.8 + wheel deceleration degree) will gradually become larger than 0.8, until at last the said ratio becomes smaller than 0.8 + wheel deceleration degree and current will flow through solenoid S2.

Figure 5:
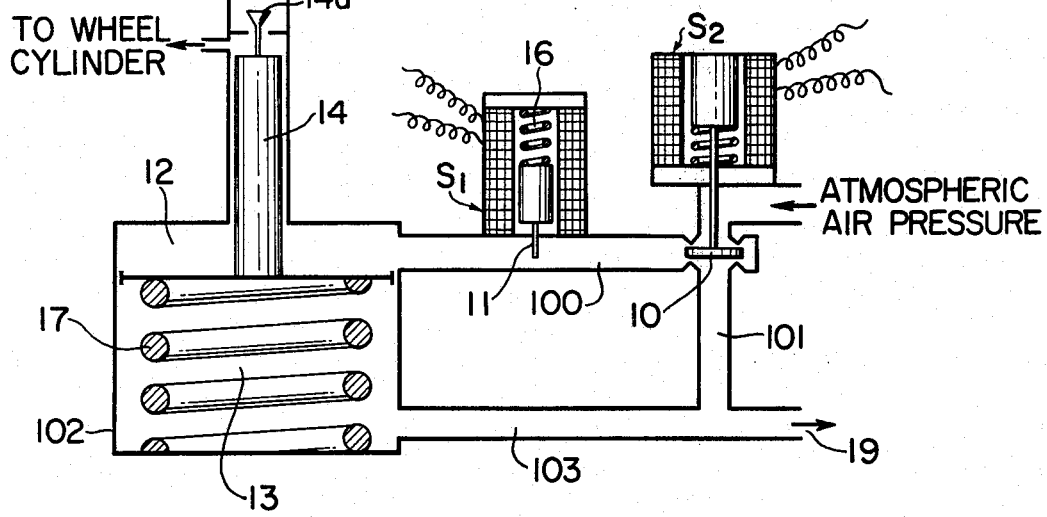
FIG. 5 is a schematic sectional view of a preferred embodiment of the brake modulator embodied in the apparatus according to this invention.

With current flow through solenoid S2, valve 10 o the brake pressure modulator shown in FIG. 5 is low ered from the position shown for interrupting fluic communication between chamber 12 and vacuum source 18 and ambient air pressure will invade through the now opened valve 10 and the duct 100 into the chamber 12. By the pneumatic pressure difference created across the plunger piston 14, the latter is forced to lower, thereby pressure prevailing in the conventional master cylinder, not shown, of the hydraulic pressure system being interrupted by the now closed valve 14a fixedly attached to the plunger part of the piston 14 and the pressure prevailing in the wheel brake cylinder, not shown, being subjected to a reduction. The lowering speed of plunger piston 14 is responsive naturally to the air flowing rate through duct 100 into the upper chamber 12, the flowing rate being controlled by the plunger valve 11. This plunger valve is controlled in turn by the energizing current of solenoid S2 in accordance with the occasional absolute value of the following term:

{wheel speed/vehicle speed − (0.8 + wheel deceleration degree)}

With increased electromagnetic force generated in solenoid S2, the plunger valve 11 will be elevated in its position against the action of return spring 16 and the correspondingly increased quantity is more abruptly introduced in the upper piston chamber 12 and the plunger piston 14 will lower with a rather higher speed. Therefore, the pressure reduction in the wheel brake cylinder is performed more rapidly at a corresponding degree, and vice versa. In this way, the wheel speed will gradually approach the stage:

wheel speed/vehicle speed = 0.8

When it is assumed that the brake application is made rather slowly and the wheel has been brought into locking rather gradually, the current flow through solenoid S1 will become nil and valve 11 is kept in its interrupting position for checking the pneumatic flow through duct 100, whereby the brake pressure being kept at a constant value and the ratio: wheel speed/vehicle speed is thus kept at 0.8.

When, conversely, the brake pressure is increased rather abruptly and the applied brake pressure amounts to a possible maximum value and the wheel initiate suddenly to lock, the condition becomes so that the ratio: wheel speed/vehicle speed is smaller than 0.8. Under these conditions, the brake pressure will be subjected to a gradual reduction, resulting thus in a wheel speed acceleration and the ratio of wheel speed to vehicle speed approaching gradually unity. The wheel is thus subjected to an acceleration and the value of (0.8 − wheel acceleration) will become gradually less than 0.8, until such condition as:

wheel speed/vehicle speed > (0.8 − wheel acceleration)

or, wheel speed/vehicle speed > (0.8 + wheel deceleration)

is realized, so as to interrupt the current passage through solenoid S2. Therefore, the valve 10 is moved so as to interrupt the fluid communication between the chamber 12 through duct 100 and the ambient atmosphere, and to establish a fluid communication between the same chamber 12 and the vacuum source 18. Thus, plunger piston 14 is moved upwards under the action of spring 17 arranged within the lower piston chamber 13, so as to recover the wheel brake pressure, this returning or pressure recovery function being controlled by the valve 11.

Thus, it will be seen that the brake pressure is recovered at a speed in response to the difference between the terms of wheel speed/vehicle speed and (0.8 − wheel acceleration) or (0.8 + wheel deceleration). Upon repetition of the aforementioned operations until a stabilized condition corresponding to:

wheel speed/vehicle speed = 0.8 is maintained.

FIG. 7 represents several operational steps of the apparatus shown and described so far.

More specifically, a representative relative relation between the vehicle speed: VA and the wheel speed: VB is graphically shown at (A) in FIG. 7. At (B), a corresponding progress of the wheel deceleration is shown. At (C), a corresponding voltage variation in terms of VC appearing at the condenser C3 is shown.

At (D) of FIG. 7, a phase relationship between the ratio: wheel speed or velocity VB/vehicle speed or velocity VA and the term: (0.8 + wheel deceleration VC) is shown again graphically.

At (E) of the same figure, the corresponding brake pressure variation progress is shown by the curve denoted PA.

Next, referring to FIGS. 8 and 9, a second embodiment is described in detail.

This second modification includes again a wheel speed sensor I' which is similar to that shown at I in the foregoing. This sensor I' includes again a d.c. generator G', resistors R1' and R2' and a condenser C1'. The function of this sensor is just same as before.

This embodiment also includes a wheel deceleration sensor II' which includes condenser C2', resistors R3' and R6' and a transistor T1'. The arrangement and function of this sensor II' is quite similar to those of the foregoing deceleration sensor II.

The present embodiment also includes a pseudo vehicle speed generating circuit III' which contains in turn similar circuit elements as before, such as C4', C5', R7'–R11', T2' and D1'. D1' means a diode as shown and corresponds to that shown at D1 in the foregoing, although it has been not mentioned in the first embodiment. It will be easily supposed that the arrangement of these parts and the function of this circuit part are perfectly similar to those of the first embodiment. It could be further noted that the condenser C4' is charged always with a voltage corresponding to occasional vehicle speed as before, and a positive voltage appears at the coupling condenser C3' when the wheel is subjected to a deceleration degree, or a negative voltage will appear thereat when the wheel is subjected to an acceleration. This voltage value corresponds to the occasional value of wheel acceleration or deceleration as the case may be, when it is generated.

The second embodiment comprises further a reference setter IV' which includes a transistor T3', resistors R12' and R13' and a condenser C3'. These elements are electrically connected with each other as shown.

The voltage accumulated in condenser C4' in function of occasional vehicle speed is coupled to the base electrode of transistor T4' upon being divided by 0.8 by the provision of resistors R12' and R13' and upon amplified at T3'. Thus, it will be seen that the base potential at the transistor T4' corresponds to the sum of a voltage corresponding to 0.8 time of the occasional wheel speed, and a voltage corresponding to a deceleration or acceleration appearing at the wheel, as the case may be.

The second embodiment circuit shown in FIG. 8 comprises a first comparator V' which is similar to that shown at VI in FIG. 4 and comprises similar circuit elements T6', T7' and T8', R17'–R20' and solenoid S2'. The arrangement of the circuit parts and the operation are substantially same as before.

The second embodiment comprises further a second comparator VI' which is substantially similar to that shown at VII in the foregoing first embodiment and includes several similar components such as transistors T4' and T5', resistors R14'–R16' and a solenoid S1', but it does not contain those components such as denoted T6, R15–R17 in the foregoing.

The second comparator VI' is so designed and arranged that it compares the occasional wheel speed with the established value in the reference setter IV' and varies the amount of the velocity which has been determined in its sense by the first comparator.

In this circuit part VI', a voltage corresponding to the wheel speed is supplied to the transistor T5' as its base potential. By the several elements such as denoted R14'–R16' and T4' and T5', a differential amplifier is constituted so as to provide to the solenoid S1 in accordance with the difference between the base potentials T4' and T5'. More specifically, a differential between (a voltage corresponding to 0.8 time of the vehicle speed plus that corresponding to the deceleration and acceleration of the wheel) and that corresponding to the wheel speed is supplied to solenoid S1' for its energization. This solenoid S1 corresponds to that shown at S1 in FIG. 5. With increase of this current, the brake pressure reduction and brake pressure restoration will be performed in a correspondingly accelerated way.

The operation of the second embodiment is as follows:

At the regular travelling of the vehicle without application of brake, the base potential at transistor T6' corresponds to (vehicle speed multiplied by 0.8) + a voltage corresponding to the wheel deceleration or acceleration. Since, in this mode of operation, the wheel deceleration or acceleration is substantially nil so that the base potential at T6' will amount to vehicle speed multiplied by 0.8, while the emitter potential at the same transistor will amount to the wheel speed. Since, under these operational conditions, the wheel speed substantially correspond to the vehicle speed so that the base potential at T6' is lower than the emitter potential thereat and thus the transistor T6' is non-conductive, and at the same time, the remaining transistors T7' and T8' are also non-conductive. No current, therefore, will flow through solenoid S2. Although a voltage corresponding to the differential between the vehicle speed multiplied by 0.8 plus wheel deceleration or acceleration, and the wheel speed appears always, at this stage, at the solenoid S1, no influence will be invited in the brake application pressure on account of the aforementioned no current passage through solenoid S2.

When the apparatus provides the desirous control function, the operation is as follows:

When a braking effort is applied to the braking system, the wheel speed will become gradually smaller than the vehicle speed and thus, the wheel deceleration will become gradually larger. Therefore, the base potential appearing at T6' will become higher than the emitter potential appearing thereat. Therefore, transistors T6'–T8' will become conductive, and current will flow through solenoid S2, so as to reduce the brake pressure. The degree of deceleration, so to speak, in the brake pressure will vary with the degree of the energization of solenoid S1 to which the voltage which corresponds to the differential between (vehicle speed × 0.8 + wheel deceleration) and the wheel speed. It is thus conceivable easily that with higher value of the said differential, the brake pressure will be reduced at a correspondingly increased rate, and vice versa. By the deceleration thus implied, the wheel speed will become gradually higher and the base potential at T6' will become gradually smaller than the value corresponding to the wheel speed multiplied by 0.8, while the emitter potential at T6' will gradually become larger, until the emitter potential will become larger than the base potential at T6', thereby the transistors T6'–T8' being turned off and no current flowing through solenoid S2. Thus, the brake pressure will be restored. This restoring speed will be in function of the differential between (vehicle speed × 0.8 minus wheel acceleration) and the wheel speed.

By repeating the above mentioned procedures, the wheel speed is brought into a closer approximation to the vehicle speed multiplied by 0.8.

In FIG. 9, the operative performance of the present embodiment is illustrated by means of several charts. In these charts, the deceleration is shown by $\dot V1$; the acceleration by V2; the vehicle speed by VA; the wheel speed by VB; the wheel deceleration or acceleration by $\dot VD$; and the brake pressure by PA, respectively.

In the uppermost chart (F), FIG. 9, a representative progress of the wheel deceleration and acceleration $\dot VD$ is illustrated.

In the next lower chart (G), a representative progress of wheel deceleration and acceleration $\dot VD$ as appearing in the condenser C3.

In the next lower chart (H), representative progress of vehicle speed VA; wheel speed VB; and a sum of wheel speed × 0.8 plus wheel deceleration and acceleration $\dot VD$ appearing at condenser C3, are shown.

In the lowermost chart (I), a representative progress of brake pressure PA is shown in phase with the foregoing chart (H).

In the foregoing several preferred embodiments, reliance is made for the generation of the vehicle speed responsive voltage exclusively upon the brake pressure. However, the invention is not limited only to such procedure and means adapted for carrying out the same. Any other means can be relied upon for the determination of the vehicle speed. Several preferred examples for attaining this purpose may be, for example, as follows:

1. vehicle speed deceleration;
2. provision of a fifth wheel kept in rolling contact with the road surface;
3. brake torque;
4. brake balance between the front and rear wheel pairs.

It will be seen from the foregoing that the apparatus for carrying out the process according to this invention has the aforementioned structural and functional features so far shown and described, thus representing the following predominant advantages:

1. Minimized fluctuation of wheel speed is attainable, resulting in a substantially shortened braking distance for the vehicle fitted with the apparatus according to this invention. No wheel lock will be experienced until the full stop of the braked vehicle and a substantially constant vehicle speed deceleration is realized over the whole progress of a braking period, which means that it can provide a more pleasant drive feeling.

2. The braking operation is carried out without exerting an excess braking effort over the necessary amount. Vacuum energy consumption may therefore be minimized. According to our practical experiments, the four wheel brake system can effectively operated by relying upon the sole use of an engine intake manifold as vacuum source.

The embodiments of the invention in which an exclusive property or privilege is claimed are as follows:

1. Apparatus for anti-skid brake control, comprising in combination,
   a master cylinder,
   a wheel cylinder,
   passage means for hydraulic connection between said master cylinder and said wheel cylinder,
   skid sensor means including means for sensing a wheel lock condition during a braking operation and for delivering a first signal upon sensing said lock condition and for sensing wheel lock recovery condition for delivering a second signal upon sensing said recovery condition, and further including means for sensing magnitudes of said wheel lock condition and wheel lock recovery condition,
   cut-off valve means provided in said passage means for on-off control of said passage means,
   volume increase and reduction means for increasing and decreasing the volume of said passage means leading from said valve means to said wheel cylinder,
   servo means operatively connected to said valve means and said volume increase and reduction means, said servo means including cylinder and piston means having two separate chambers within said servo means on opposite sides of said piston means,
   an air change-over valve means operable in response to said two signals from said sensor means and for establishment of an air pressure differential between said two chambers, and control valve means operable in response to said wheel lock condition and said wheel lock recovery condition sensed by said sensor means, said control valve means being operably connected to one of said chambers for varying the rate of air delivery to said servo means in response to operation of said air change-over valve means, whereby the rate of reduction in and restoration of the wheel cylinder brake pressure is controlled in response to the magnitudes of said wheel lock and wheel lock recovery conditions.

2. Apparatus as set forth in claim 1 wherein said air change-over valve means has a first position wherein vacuum is conveyed to said two chambers in said servo means upon reception of said second signal, and a second position wherein air is introduced into one of said two chambers upon reception of said first signal.

3. Apparatus as set forth in claim 2 wherein said control valve means limits the air flow rate to and from one of said two chambers in response to said wheel lock condition and said wheel lock recovery condition, respectively.

4. Apparatus for anti-skid brake control, comprising in combination,
   a master cylinder,
   a wheel cylinder,
   passage means for hydraulic connection between said master cylinder and said wheel cylinder,
   skid sensor means including means for sensing a wheel lock condition during a braking operation and for delivering a first signal upon sensing said lock condition and for sensing wheel lock recovery condition for delivering a second signal upon sensing said recovery condition, and further including means for sensing magnitudes of said wheel lock condition and wheel lock recovery condition,
   cut-off valve means provided in said passage means for on-off control of said passage means,
   volume increase and reduction means for increasing and decreasing the volume of said passage means leading from said valve means to said wheel cylinder,
   servo means operatively connected to said valve means and said volume increase and reduction means, said servo means including cylinder and piston means having two separate chambers within said servo means on opposite sides of said piston means,
   change-over valve means operable in response to said two signals from said sensor means and for establishment of a fluid pressure differential between said two chambers, and control valve means operable in response to said wheel lock condition and said wheel lock recovery condition sensed by said sensor means, said control valve means being operably connected to one of said chambers for varying the rate of fluid delivery to said servo means in response to operation of said change-over valve means, whereby the rate of reduction in and restoration of the wheel cylinder brake pressure is controlled in response to the magnitudes of said wheel lock and wheel lock recovery conditions.

5. Method for anti-skid brake control comprising:
   generating first, second, third, and fourth instruction signals in response to wheel rotational conditions, said first and second instruction signals being generated in response to wheel lock and wheel lock recovery, respectively, and said third and fourth instruction signals being generated in response to magnitudes of said wheel lock and wheel lock recovery, respectively,
   reducing wheel cylinder pressure upon reception of said first instruction signal,
   restoring the thus reduced wheel cylinder pressure upon reception of said second instruction signal,
   varying the rate of said wheel cylinder pressure reduction velocity upon reception of said third instruction signal, and
   varying the rate of said wheel cylinder pressure restoration upon reception of said fourth instruction signal.

* * * * *